(12) United States Patent
Vidyadhara et al.

(10) Patent No.: US 10,789,200 B2
(45) Date of Patent: Sep. 29, 2020

(54) SERVER MESSAGE BLOCK REMOTE DIRECT MEMORY ACCESS PERSISTENT MEMORY DIALECT

(71) Applicant: DELL PRODUCTS L.P., Round Rock, TX (US)

(72) Inventors: Sumanth Vidyadhara, Bangalore (IN); Shekar Babu Suryanarayana, Bangalore (IN)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 15/995,708

(22) Filed: Jun. 1, 2018

(65) Prior Publication Data
US 2019/0370214 A1 Dec. 5, 2019

(51) Int. Cl.
G06F 9/54 (2006.01)
G06F 15/173 (2006.01)
G06F 13/16 (2006.01)

(52) U.S. Cl.
CPC ........ *G06F 15/17331* (2013.01); *G06F 9/546* (2013.01); *G06F 13/1642* (2013.01)

(58) Field of Classification Search
None
See application file for complete search history.

(56) References Cited

U.S. PATENT DOCUMENTS

| | | |
|---|---|---|
| 6,964,023 B2 | 11/2005 | Maes et al. |
| 7,152,090 B2 | 12/2006 | Amirisetty et al. |
| 8,332,526 B2 | 12/2012 | Kruse et al. |
| 8,353,042 B2 | 1/2013 | Crawford |
| 8,788,569 B2 | 7/2014 | Griffiths et al. |
| 8,838,668 B2 | 9/2014 | Eisner et al. |
| 9,185,125 B2 | 11/2015 | Varsanyi et al. |
| 9,599,990 B2 | 3/2017 | Halloran et al. |
| 9,930,099 B2 | 3/2018 | McCanne et al. |
| 2017/0034268 A1* | 2/2017 | Govind .............. H04L 67/1097 |
| 2017/0040051 A1* | 2/2017 | Edirisooriya ..... G11C 11/40622 |
| 2018/0024838 A1* | 1/2018 | Nachimuthu ....... H03M 7/4056 713/1 |
| 2018/0032429 A1* | 2/2018 | Liu ..................... G06F 12/0873 |

FOREIGN PATENT DOCUMENTS

CA 2469664 8/2016

* cited by examiner

*Primary Examiner* — Shih-Wei Kraft
(74) *Attorney, Agent, or Firm* — Jackson Walker LLP; Christopher J. Rourk

(57) ABSTRACT

A multiple processor system comprising a first processor configured to utilize an inter-processor messaging protocol and a second processor configured to utilize the inter-processor messaging protocol is disclosed. The system includes a non-volatile memory device coupled to the first processor, wherein the second processor is configured to access the non-volatile memory device by utilizing the inter-processor messaging protocol.

8 Claims, 5 Drawing Sheets

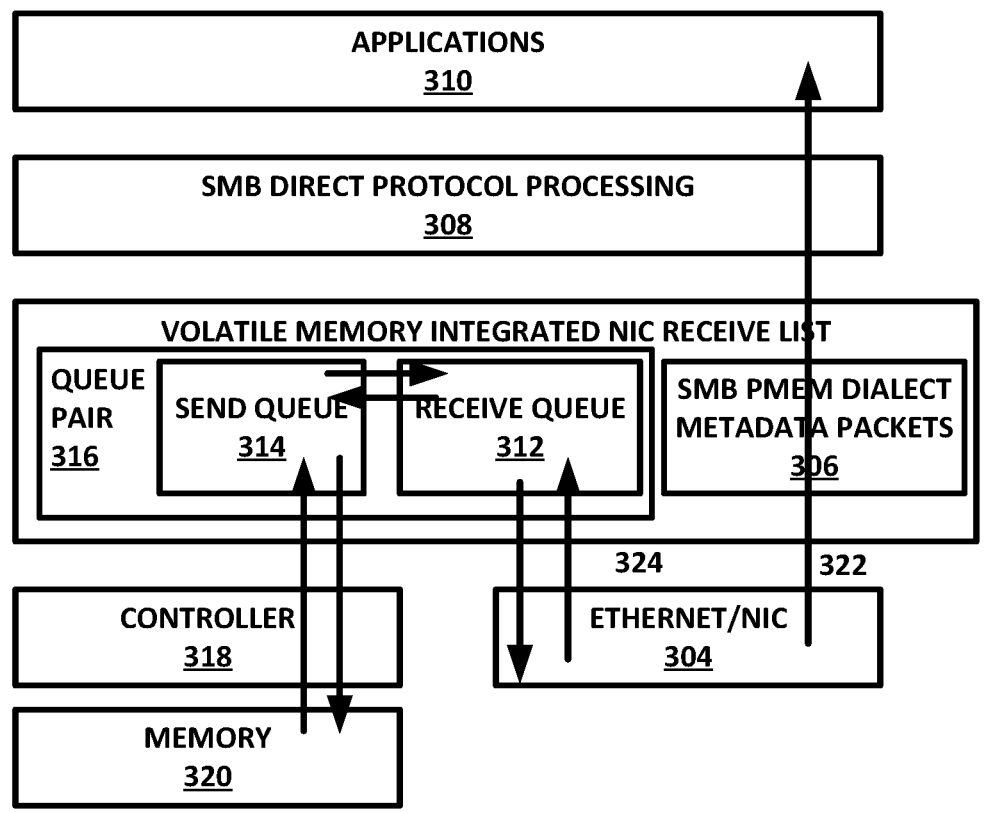
FIGURE 3    300 

SERVER MESSAGE BLOCK REMOTE DIRECT MEMORY ACCESS PERSISTENT MEMORY DIALECT

TECHNICAL FIELD

The present disclosure relates generally to processors, and more specifically to a server message block remote direct memory access persistent memory dialect.

BACKGROUND OF THE INVENTION

Non-volatile memory is typically accessed by a local processor. Direct access to the non-volatile memory that does not require the local processor to operate a file system is not known.

SUMMARY OF THE INVENTION

A multiple processor system is disclosed that includes a first processor that is configured to utilize an inter-processor messaging protocol, and a second processor that is also configured to utilize the inter-processor messaging protocol. The system also includes a non-volatile memory device coupled to the first processor, wherein the second processor is configured to access the non-volatile memory device by utilizing the inter-processor messaging protocol.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which:

FIG. 3 is a diagram of a system for providing an SMB PMEM stack transaction for data push/pull to non-volatile memory storage, in accordance with an example embodiment of the present disclosure;

DETAILED DESCRIPTION OF THE INVENTION

Figure 1:
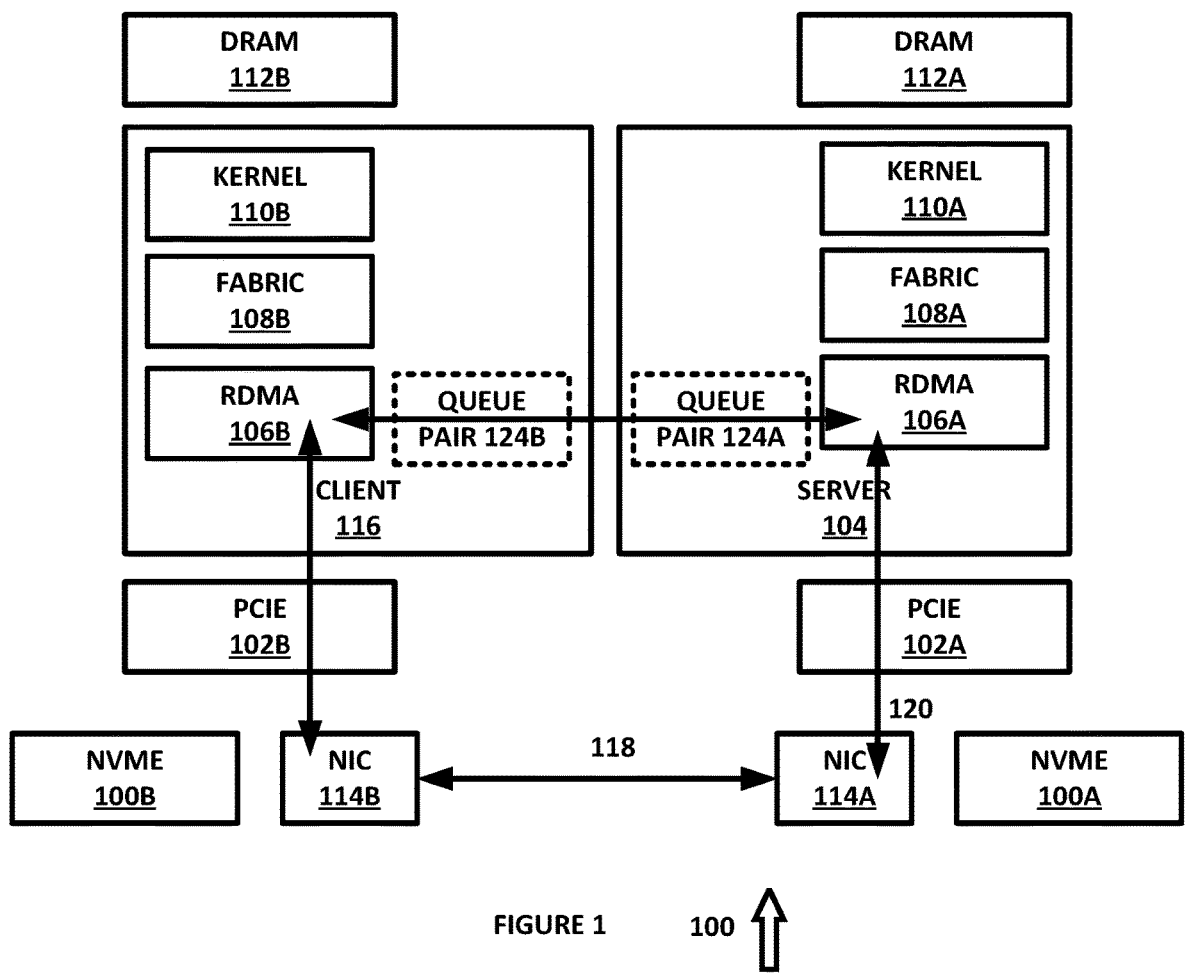
FIG. 1 is a diagram of a system utilizing an SMB PMEM dialect, in accordance with an example embodiment of the present disclosure.

In the description that follows, like parts are marked throughout the specification and drawings with the same reference numerals. The drawing figures may be to scale and certain components can be shown in generalized or schematic form and identified by commercial designations in the interest of clarity and conciseness.

Non-volatile memory, such as a solid state drive, is usually limited to access by the local host, and no solution exists to expose the non-volatile memory persistent storage over a network to allow direct access by a remote client via network protocols, such as Server Message Block (SMB) or Network File System.

Existing persistent memory (PMEM) solutions that are tied to remote direct memory access (RDMA) can reserve a memory region and present it to a user space as a block device, but a PMEM aware file system is needed for an RDMA transaction for a user application.

No existing solutions are available to efficiently push or pull RDMA payload to or from a non-volatile memory by leveraging RDMA queues with non-volatile memory queues, such as by using SMB communications or other suitable communications.

The dynamic random access memory (DRAM) content is stored to the non-volatile memory persistent area during power failure. If the stored content in the persistent area needs to be booted remotely on another server, such as for trouble shooting, current SMB communications are not able to support.

Any hibernated image of a virtual machine (VM) or host operating system (OS) can't be booted directly from a non-volatile memory persistent area remotely. OS/VM deployment of a direct non-volatile memory namespace over RDMA is not supported. In pre-boot Unified Extensible Firmware Interface (UEFI) mode there are no existing methods to directly download firmware images to non-volatile memory namespaces over a common Internet file system (CIFS) SMB network file system for faster direct staged updates.

Being able to resolve these problems will provide for a number of advantages. One advantage is faster OS deployment including Service OS (SOS) download by eliminating the host CPU cycle, so that an OS can be directly deployed to the non-volatile memory namespace. While an OS must typically be installed to accommodate the specific configuration of hardware and software, when a processor has a controlled configuration (such as in an enterprise environment), directly deploying the OS to the non-volatile memory namespace becomes feasible.

Another advantage is that network and storage IO operations can be made CPU independent. At OS runtime, all non-CPU bound operations (such as cloud storage access) can be performed in a faster and more efficient manner. Another advantage is that reliable distributed storage for cloud-based applications is made possible, because storage can be accessed without having a local permanent memory-aware file system, even during OS crash or in a pre-OS mode of operation. This solution can also be used to provide for faster network file system operations like SMB Direct, NFS and file transfer protocol (FTP) operations.

Existing RDMA peer-to-peer communications using a network protocol like SMB requires a long path, to pull and push an SMB payload from a remote host to local host. The path is shown in FIG. 1. The SMB client and server both use a local file system to read data and files from the server non-volatile memory storage and pass it to the client using an RDMA method, to write the data and files to the client's non-volatile memory storage. In order to accomplish this transfer, a local file system and a processing stack from the RDMA-enabled Network Interface Controller (RNIC) to the DRAM, and then back to the remote DRAM for non-volatile memory storage is needed, and this constitutes transaction overhead.

The disclosed RDMA communication path for the SMB PMEM dialect reduces the local file system dependency, and also increases the throughput, by using a reduced number of stack transactions at both the client and server, when used with non-volatile memory storage and RDMA fabric, as shown herein.

A similar issue is present when performing RDMA peer-to-peer communication with non-volatile dual in-line memory (NVDIMM) storage as well. Non-volatile memory and NVDIMM each have the capability to provide block oriented access to the persistent area through the shared command buffer, as a mounted drive. The proposed solution described in this disclosure enables persistent storage for non-volatile memory to be accessed remotely via SMB direct with the disclosed RDMA dialect over the host non-volatile memory.

FIG. 1 is a diagram of a system 100 utilizing an SMB PMEM dialect, in accordance with an example embodiment of the present disclosure. System 100 includes server 104 and client 116, where server 104 includes peripheral component interconnect express (PCIE) interface 102A, RDMA 106A, switch fabric 108A, processor kernel 110A, DRAM 112A, NVME 100A and NIC 114A, and where client 116 includes PCIE 102B, RDMA 106B, switch fabric 108B, processor kernel 110B, DRAM 112B, NVME 100B and NIC 114B. NIC 114A and 114B communicate with each other over network 118, and data flow path 120 is used to communicate through queue pair 124A and 124B.

PCIE 102A and 102B are special purpose devices that include hardware and software, and provide data communications interfaces to peripheral components. In one exemplary embodiment, PCIE 102A and 102B can be a solid state drive (SSD) that is used on a Dell PowerEdge Express Flash NVMe PCIe SSD Adapter, available from Dell at dell.com, or other suitable devices. PCIE 102A and 102B can have x4 lane width for a 16-channel flash memory controller, and can be used to transmit or receive storage interface commands between the host and external peripheral devices. In one example embodiment, additional details about PCIE 102A and 102B can be provided by U.S. Pat. No. 9,940,143 B2, which is hereby incorporated by reference for all purposes, as if set forth herein in its entirety.

RDMA 106A and 106B enable efficient data transfer by eliminating the need for creation of additional copies of transferred data, involvement of the operating system and involvement of the central processing unit (CPU). RDMA 106A and 106B reduce latency and increase throughput by allowing one compute node to directly place data in another node's memory with minimal demands on memory bus bandwidth and CPU processing overhead. In one example embodiment, additional details about RDMA 106A and 106B can be provided by U.S. patent application publication 2013/0325998 A1, which is hereby incorporated by reference for all purposes, as if set forth herein in its entirety.

Switch fabric 108A and 108B can provide a core network switching architecture, such as a two stage Clos Leaf-Spine fabric based on a fat tree architecture or other suitable switches. Switch fabric 108A and 108B can provide full bisectional bandwidth between compute nodes in a large cluster using high-capacity low-cost Ethernet switches, such as to automate the design process for building a distributed core fabric, to create a wiring plan that helps in implementing the architecture with exact guidance on how the switch ports need to be connected and to automate a multi-switch configuration process. In one example embodiment, additional details about switch fabric 108A and 108B can be provided by U.S. patent application publication 2015/0016277 A1, which is hereby incorporated by reference for all purposes, as if set forth herein in its entirety.

Processor kernel 110A and 110B can provide operating system kernel functionality for server 104 and client 116, respectively. In one example embodiment, additional details about processor kernel 110A and 110B can be provided by U.S. patent application publication 2016/0179704 A1, which is hereby incorporated by reference for all purposes, as if set forth herein in its entirety.

DRAM 112A and 112B can provide dynamic random access memory for use by the hardware and software components of server 104 and client 116.

NVME 100A and 100B provide non-volatile memory functionality for controlling the configuration of server 104 and client 106. NVME 100A and 100B can be implemented as a software interface for PCIE SSDs that use non-volatile memory (NVM). In one example embodiment, additional details about NVME 100A and 100B can be provided by U.S. Pat. No. 9,477,295 B2, which is hereby incorporated by reference for all purposes, as if set forth herein in its entirety.

NIC 114A and 114B provide network interface functionality for server 104 and client 116, such as to enable network communications over network 118. Network 118 can be a wireless network, a wireline network, an optical network, other suitable networks or a suitable combination of such networks.

Queue pair 124A and 124B eliminate the need for communications using fabric 108A and 108B, kernel 110A and 110B and DRAM 112A and 112B, and allow remote access to non-volatile memory without the additional overhead that would otherwise be required from the omitted components.

Data transmission path 122 identifies an example pathway for payload transactions that can be supported that do not require the use of a local PMEM aware file system, which can reduce the need for higher stack transactions. The SMB PMEM dialect can be implemented as an SMB standard dialect, an original equipment manufacturer (OEM) unique dialect or in other suitable manners. During negotiation for this dialect, both client 116 and server 104 can perform direct PMEM transactions over non-volatile memory namespaces. These transactions are referred to herein as RDPA (Remote Direct Persistent Memory Access) transactions.

Figure 2:
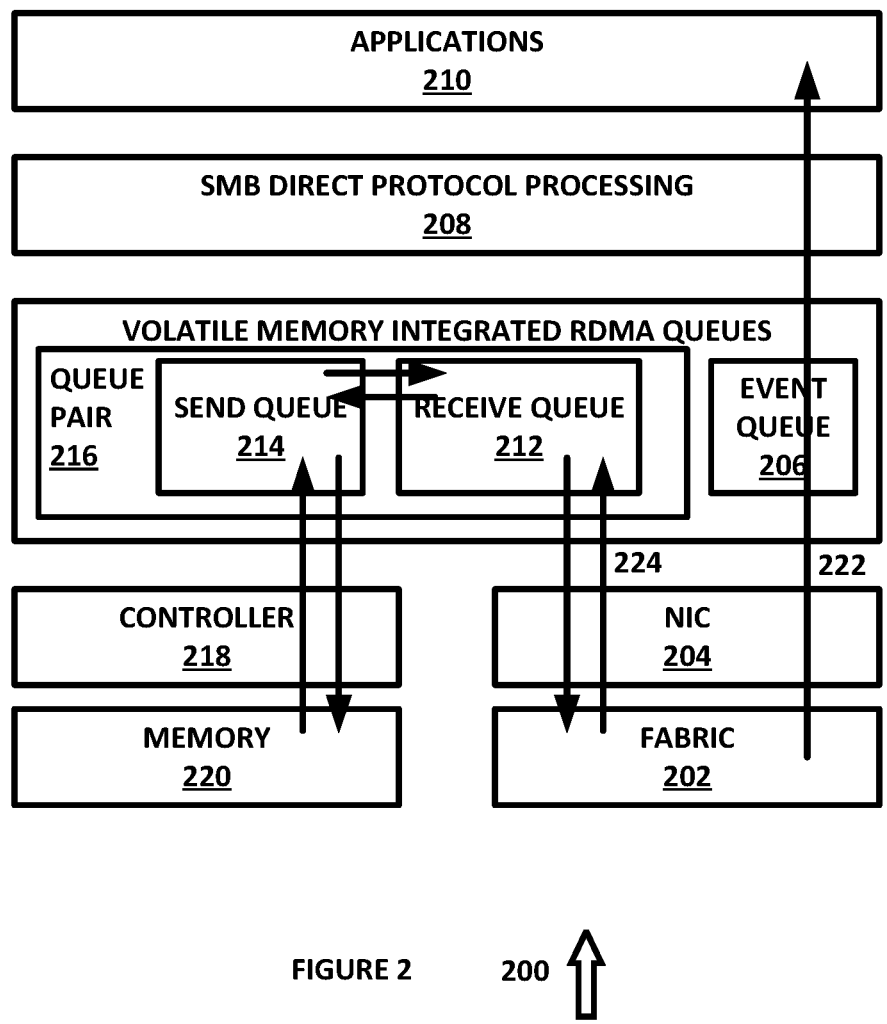
FIG. 2 is a diagram of a system for providing an SMB PMEM direct stack transaction for data push/pull to non-volatile memory storage, in accordance with an example embodiment of the present disclosure.

FIG. 2 is a diagram of a system 200 for providing an SMB PMEM direct stack transaction for data push/pull to non-volatile memory storage, in accordance with an example embodiment of the present disclosure. System 200 includes fabric 202, NIC 204, event queue 206, SMB direct protocol processing layer 208, applications layer 210, receive queue 212 and send queue 214 of queue pair 216, controller 218 and memory 220, each of which can be implemented in hardware or a suitable combination of hardware and software.

The integrated RDMA queues (event queue 206 and receive queue 212 and send queue 214 of queue pair 216) support SMB PMEM direct command processing, and avoid the need for memory to be assigned for RDMA, as well as the need for a PMEM aware file system. The integrated RDMA queues efficiently push and pull RDMA payload to and from non-volatile memory by leveraging RDMA queues with non-volatile memory queues over SMB direct or other suitable network infrastructure.

FIG. 3 is a diagram of a system 300 for providing an SMB PMEM stack transaction for data push/pull to non-volatile memory storage, in accordance with an example embodiment of the present disclosure. System 300 includes Ethernet/NIC 304, SMB PMEM dialect metadata packets 306, SMB direct protocol processing layer 308, applications layer 310, receive queue 312 and send queue 314 of queue pair 316, controller 318 and memory 320, each of which can be implemented in hardware or a suitable combination of hardware and software.

The integrated RDMA queues (event queue 306 and receive queue 312 and send queue 314 of queue pair 316) support SMB PMEM dialect metadata command processing, and avoid the need for memory to be assigned for RDMA, as well as the need for a PMEM aware file system. The integrated RDMA queues efficiently push and pull RDMA payload to and from non-volatile memory by leveraging RDMA queues with non-volatile memory queues over SMB direct or other suitable network infrastructure.

In pre-boot UEFI mode, there is no existing method to directly download firmware images to non-volatile memory namespaces over CIFS (SMB) network file systems. The system and method of the present disclosure can be used to directly download firmware images to non-volatile memory namespaces without using a local file system.

In addition, there are typically no RDMA operations that are utilized over a non-volatile memory namespace. The system and method of the present disclosure uses a UEFI global unique identifier (GUID)-based device path with a CIFS protocol, which allows CIFS to start RDMA transactions over the non-volatile memory namespace, such as by using PMEM-aware drives or in other suitable manners.

As previously noted, all existing RDMA CIFS transactions require a local file system, in order to be implemented. The system and method of the present disclosure eliminates that need, because use of a local file system (such as EXT3 in EFI mode) is very costly, and reduces system performance.

One use case for the disclosed system and method is non-volatile memory in UEFI as a UEFI device path, for faster RDMA. For example, there are no clear solutions for non-volatile memory device path use cases in a pre-boot configuration using UEFI without the present disclosure.

Figure 4:
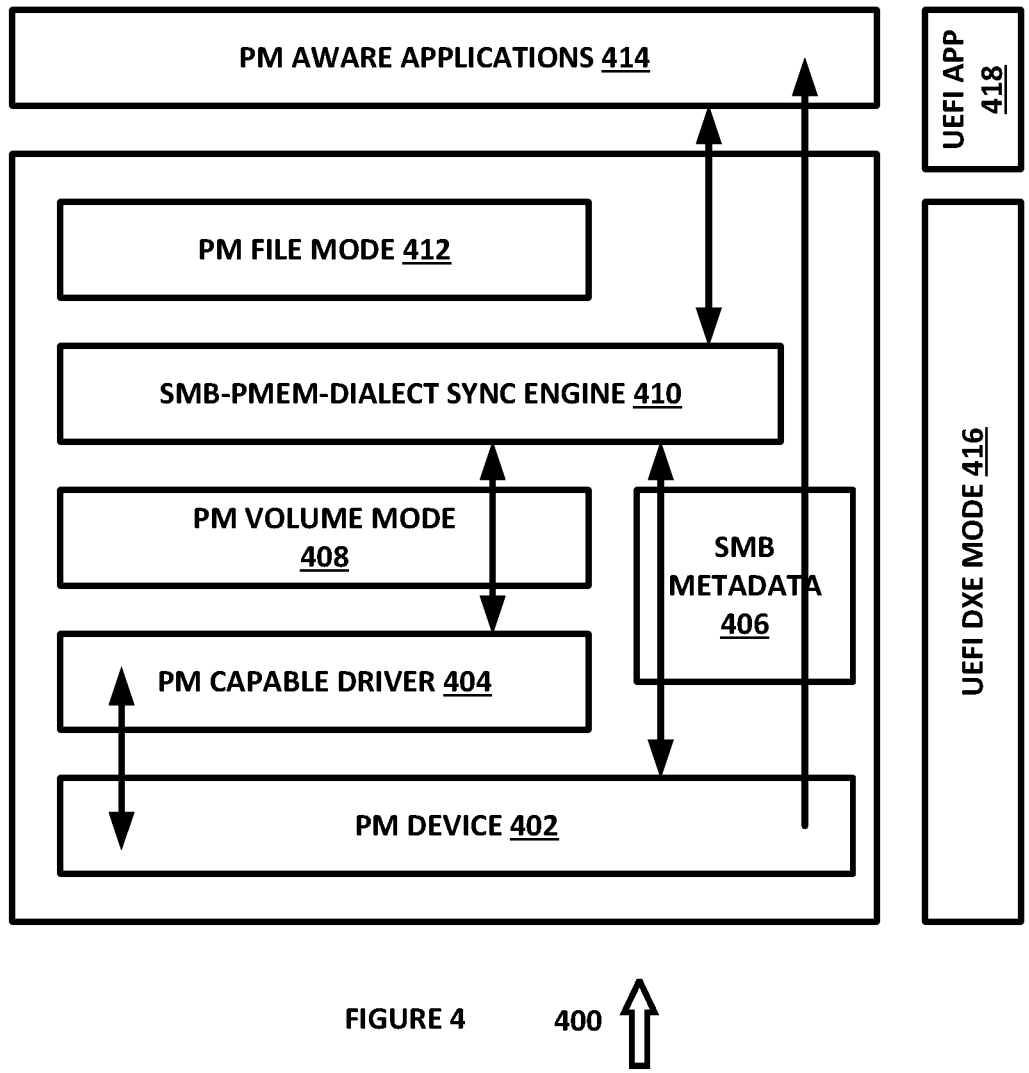
FIG. 4 is a diagram of a system providing an SMB PMEM dialect, in accordance with an example embodiment of the present disclosure.

FIG. 4 is a diagram of a system 400 providing an SMB PMEM dialect, in accordance with an example embodiment of the present disclosure. System 400 includes persistent memory device 402, persistent memory capable driver 404, SMB metadata 406, persistent memory volume mode 408, SMB PMEM dialect sync engine 410, PC file mode 412, persistent memory aware applications 414, UEFI DXE mode 416 and UEFI app 418, each of which can be implemented in hardware or a suitable combination of hardware and software.

SMB metadata 406 provides a lightweight metadata communication pathway between the persistent memory device 402 and SMB PMEM dialect sync engine 410. The use of naming permissions during SMB PMEM dialect eliminates the overhead of extra processing that would otherwise be required, and makes it the process more robust and efficient in the pre-boot space.

The SMB PMEM dialect creates an abstraction for all persistent operations, thus eliminating the need for a PMEM aware file system, such as for NVM.PM.Volume Mode operations in UEFI or NVM.PM.FILE Mode operations in UEFI. The persistent memory metadata binary language object (BLOB) or reconnectable BLOBs of persistence provides naming permissions during SMB PMEM dialect, and eliminates the overhead of extra processing required for the prior art processes. This configuration is more robust and efficient in the pre-boot space.

Figure 5:
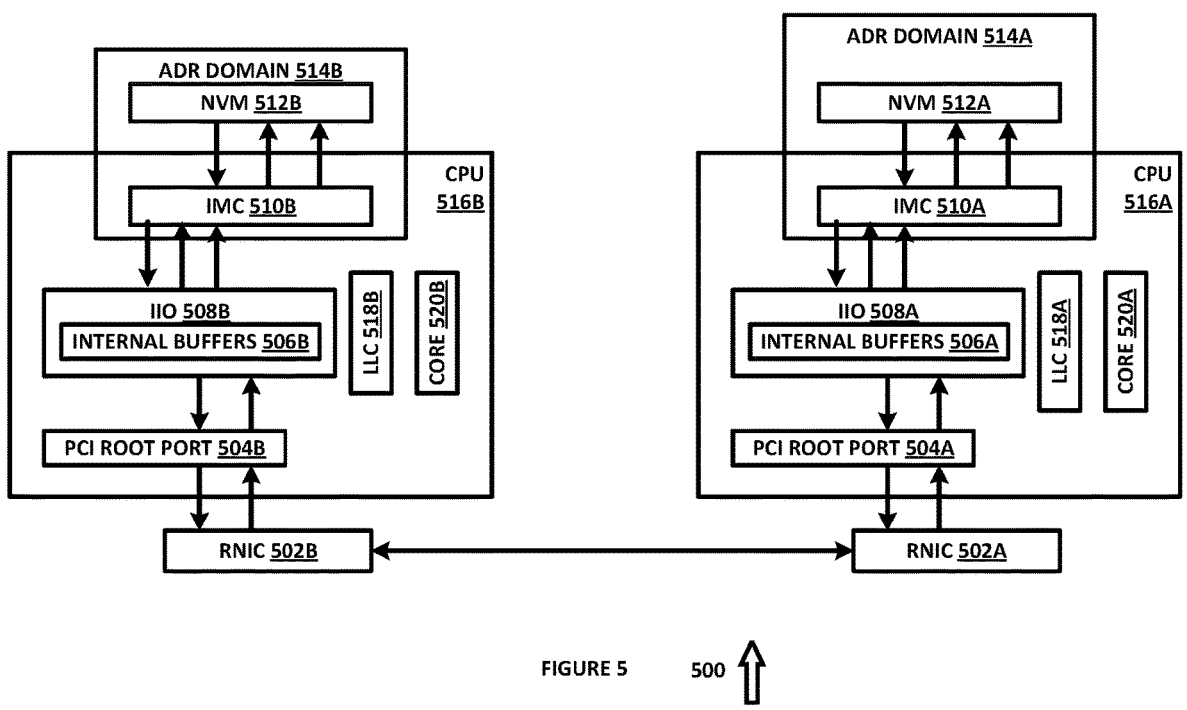
FIG. 5 is a diagram of a system for supporting client-server transactions to access an NVDIMM device path, in accordance with an example embodiment of the present disclosure.

FIG. 5 is a diagram of a system 500 for supporting client-server transactions to access an NVDIMM device path, in accordance with an example embodiment of the present disclosure. System 500 includes RNIC 502A and 502B, PCI root port 504A and 504B, internal buffers 506A and 506B, IIO 508A and 508B, IMC 510A and 510B, NVM 512A and 512B, ADR domain 514A and 514B, CPU 516A and 516B, LLC 518A and 518B and core 520A and 520B, each of which can be implemented in hardware or a suitable combination of hardware and software.

The disclosed RDMA communication with the SMB PMEM dialect reduces the local PMEM aware file system dependency, and increases the throughput with reduced numbers of stack transactions at both the client and the server, such as when the RDMA communications are used with NVDIMM namespace storage and RDMA fabric, as shown in FIG. 5. The RDMA payload for PCI root port 605A and 504B is directly stored to DMA from RNIC 502A and 502B, by using non-allocated write transactions, and is ultimately stored in the NVDIMM name space area.

The system and method of the present disclosure use RDMA communications with an SMB PMEM dialect to reduce the local PMEM-aware file system dependency, as well as to increase the through put with reduced numbers of stack transactions at both the client and the server, such as when used with an NVDIMM namespace storage and RDMA fabric, as shown in FIG. 1. The PCIe RNIC RDMA payload can be handled directly through the DMA by using non-allocated write transactions, and then be stored in the NVDIMM namespace area.

In regards to direct PMEM access mapping with device buffers, entries in an NVDIMM firmware interface table (NFIT) can be used to identify and expose a particular namespace for remote access using SMB protocol, by using the SMB PMEM dialect. In pre-boot, the namespaces are marked as remote access capable, which includes NFIT namespace entries. Corresponding labels can be provided with a sublabel and a remote PMEM enable, where all the namespaces with a sublabel are scanned.

In the present disclosure, SMB drivers can be shared to peers for RDMA operations. The SMB driver can execute a peripheral command buffer mapping with the namespace differential power analysis (DPA), such as by using the DIMM/non-volatile memory physical address. This process allows the RDMA NIC device transmit/receive buffer's DMA address range to be directly mapped to DPA. This process is similar to DPA to simple power analysis (SPA) mapping, but the NFIT table intelligently generates the address spaces and maps them when the SMB_PMEM_DIRECT dialect is executed. The NFIT table's address range and mapping can also be used to pull and push data from an RNIC device directly to PMEM area of NVDIMM.

In regards to the SMB protocol command dialect sequence, the client negotiates an OEM unique SMB dialect (SMB_PMEM_DIRECT) over an existing Microsoft LAN manager (LANMAN) or NT LAN manager dialect. After successful negotiation of an SMB_PMEM_DIRECT dialect, the client or server can send out the namespace characteristics to the peer. The peer can then send RDMA commands and data transactions directly over the remote NVDIMM persistent memory.

The SMB_PMEM_DIALECT thus eliminates the storage dependency for OS deployment, allowing the OS to be directly deployed to a non-volatile memory namespace. A faster SMB file copy operation can be performed, by using an OEM proprietary non-volatile memory SMB dialect. The SMB dialect can also be used to exchange the hardware characteristics of the system between a client and a server, which is faster compared to the current approach of hosting the address space and meta-data in the client and the server.

Exposing the NVDIMM namespace to an RDMA based CIFS or SMB direct is not possible without the present disclosure, which provides value by utilizing that capability as part of the solution. The solution also uniquely exposes a UEFI GUID-based device path to CIFS protocol, so that CIFS can start RDMA transactions over a non-volatile memory namespace using any PMEM aware drives. The present disclosure further provides a UEFI-based dynamic update of UEFI device paths in the NFIT table, for an OEM proprietary ACPI source language (ASL) code to determine the non-volatile memory namespaces for better manageability. The OS can use this NVDIMM namespace from ASL code to understand the OS installation and driver pack (boot critical driver) files by pre-boot, using this method.

In contrast, the prior art SMB direct provides for RDMA transactions using the SMB protocol, but doesn't have an intelligence to detect the underlying storage both at the client and the server and to start an optimized and faster RDMA for the non-volatile memory namespace arenas. For example, one common prior art solution has an input/output on PMEM through a PMEM aware file system, but is not configured to leverage the RDMA payload with non-volatile memory payloads over the SMB direct protocol.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A multiple processor system comprising:
   a first processor configured to utilize a server message block protocol;
   a second processor configured to utilize the server message block protocol;

a non-volatile memory device coupled to the first processor;

wherein the second processor is configured to push and pull data from the non-volatile memory device by utilizing remote direct memory access queues in conjunction with non-volatile memory queues and an entry in a non-volatile dual in-line memory (NVDIMM) firmware interface table (NFIT), wherein the non-volatile memory queues are integrated with a network interface controller receive list and the entry is an NFIT namespace entry marked as remote access capable during pre-boot;

wherein the second processor utilizes remote direct memory access queues to perform server message block protocol metadata command processing;

wherein the remote direct memory access queues include an event queue and a queue pair; and wherein the second processor utilizes reconnectable binary language objects to provide naming permissions.

2. The multiple processor system of claim 1, wherein a label is provided for the NFIT namespace entry during pre-boot.

3. The multiple processor system of claim 1, wherein a label is provided with a sublabel for the NFIT namespace during pre-boot.

4. The multiple processor system of claim 1, wherein a label is provided with a sublabel and a remote PMEM enable for the NFIT namespace during pre-boot.

5. A method for controlling a multiple processor system comprising:

configuring a first processor to utilize a server message block protocol;

configuring a second processor to utilize the server message block protocol;

wherein the second processor is configured to push and pull data from a non-volatile memory device coupled to the first processor by utilizing remote direct memory access queues in conjunction with non-volatile memory queues and an entry in a non-volatile dual in-line memory (NVDIMM) firmware interface table (NFIT), wherein the non-volatile memory queues are integrated with a network interface controller receive list and the entry is an NFIT namespace entry marked as remote access capable during pre-boot;

wherein the second processor utilizes the remote direct memory access queues to perform server message block protocol metadata command processing;

wherein the remote direct memory access queues include an event queue and a queue pair; and wherein the second processor utilizes reconnectable binary language objects to provide naming permissions.

6. The method of claim 5 wherein a label is provided for the NFIT namespace entry during pre-boot.

7. The method of claim 5 wherein a label is provided with a sublabel for the NFIT namespace during pre-boot.

8. The method of claim 5 wherein a label is provided with a sublabel and a remote PMEM enable for the NFIT namespace during pre-boot.

\* \* \* \* \*